(12) United States Patent
Conway et al.

(10) Patent No.: US 7,847,523 B2
(45) Date of Patent: Dec. 7, 2010

(54) SYSTEMS AND METHODS FOR OPTIMIZING THE OPERATION OF A GENERATOR

(75) Inventors: Brian D. Conway, Mount Prospect, IL (US); Patrick A. O'Gorman, Grayslake, IL (US); Dennis L. Stephens, Barrington, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 488 days.

(21) Appl. No.: 12/036,201

(22) Filed: Feb. 22, 2008

(65) Prior Publication Data
US 2009/0212746 A1 Aug. 27, 2009

(51) Int. Cl.
*H02P 9/00* (2006.01)
(52) U.S. Cl. .............................. 322/20; 322/19; 322/37
(58) Field of Classification Search .................. 322/19, 322/20, 22, 28, 29, 37, 59
See application file for complete search history.

(56) References Cited

U.S. PATENT DOCUMENTS

| | | | | |
|---|---|---|---|---|
| 4,677,364 A | * | 6/1987 | Williams et al. | ............... 322/47 |
| 5,652,485 A | * | 7/1997 | Spiegel et al. | ............... 318/147 |
| 5,739,677 A | | 4/1998 | Tsutsui | |
| 5,773,964 A | | 6/1998 | Peter | |
| 5,793,167 A | | 8/1998 | Liang | |
| 6,081,084 A | | 6/2000 | Crecelius | |
| 6,239,582 B1 | | 5/2001 | Buzan | |
| 6,285,168 B1 | * | 9/2001 | Davis | ........................... 322/20 |
| 6,555,993 B2 | * | 4/2003 | Taniguchi et al. | ............. 322/28 |
| 6,894,402 B2 | | 5/2005 | Dubus et al. | |
| 7,015,595 B2 | * | 3/2006 | Feddersen et al. | ............. 290/44 |
| 7,215,098 B2 | * | 5/2007 | Harris et al. | ................... 322/24 |
| 7,239,113 B2 | * | 7/2007 | Johnson | ........................ 322/58 |
| 7,400,052 B1 | * | 7/2008 | Badger | ........................ 290/1 A |
| 2002/0176266 A1 | | 11/2002 | Perreault et al. | |
| 2003/0075997 A1 | | 4/2003 | Keim et al. | |
| 2004/0232538 A1 | | 11/2004 | Linke | |
| 2005/0087990 A1 | | 4/2005 | Henry | |
| 2005/0168196 A1 | | 8/2005 | Pillote et al. | |

FOREIGN PATENT DOCUMENTS

WO     0249184     6/2002

OTHER PUBLICATIONS

Juan M. Rivas, Prof. David J. Perreault, Dr. Thomas Keim, Performance Improvement of Alternators with Switched-Mode Rectifiers; 0-7803-7754-0/03 2003 IEEE; (8 pgs.).

* cited by examiner

*Primary Examiner*—Nicholas Ponomarenko

(57) ABSTRACT

Methods and systems for minimizing power loss in generator are disclosed, including providing one or more operating parameters for a generator, and determining an optimal field power and an optimal phase angle, where the optimal field power and the optimal phase angle substantially minimize a power loss in operating the generator at the one or more operating parameters.

23 Claims, 6 Drawing Sheets

SYSTEMS AND METHODS FOR OPTIMIZING THE OPERATION OF A GENERATOR

I. BACKGROUND

The invention relates generally to the field of converting mechanical energy to electrical energy.

The efficiency of electricity generators depends on many parameters some which can be controlled. Effective control of such parameters can lead to more energy efficient generators.

II. SUMMARY

In one respect, disclosed is a method for minimizing power loss in a generator, the method comprising: providing one or more operating parameters for the generator; and determining an optimal field power and an optimal phase angle, where the optimal field power and the optimal phase angle substantially minimize a power loss in operating the generator at the one or more operating parameters.

In another respect, disclosed is a method for minimizing power loss in an generator, the method comprising: monitoring a power loss in operating the generator for a set of operating parameters for the generator; varying a field power and a phase angle using the power loss as feedback to determine an optimal field power and an optimal phase angle that substantially minimize the power loss for the set of operating parameter.

In yet another respect, disclosed is a computer program product stored on a computer operable medium, the computer program product comprising software code being effective to: receive values for one or more operating parameters for a generator; and determine an optimal field power and an optimal phase angle, where the optimal field power and the optimal phase angle substantially minimize a power loss in operating the generator at the one or more operating parameters.

In yet another respect, disclosed is a generator, the generator comprising: a rotor coil configured to receive field electrical power through a regulator; a stator coil configured to output electrical power through a rectifier having a phase angle, where the stator coil and the rotor coil are configured to rotate relative to each other using mechanical power; one or more processors coupled to the rotor coil and to the stator coil; and one or more memory units coupled to the processors, where the processors and the memory units are configured to monitor operating parameters of the generator and are further configured to control the field electrical power and the phase angle and to determine an optimal field power and an optimal phase angle, where the optimal field power and the optimal phase angle substantially minimize a power loss in operating the generator at the one or more operating parameters.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
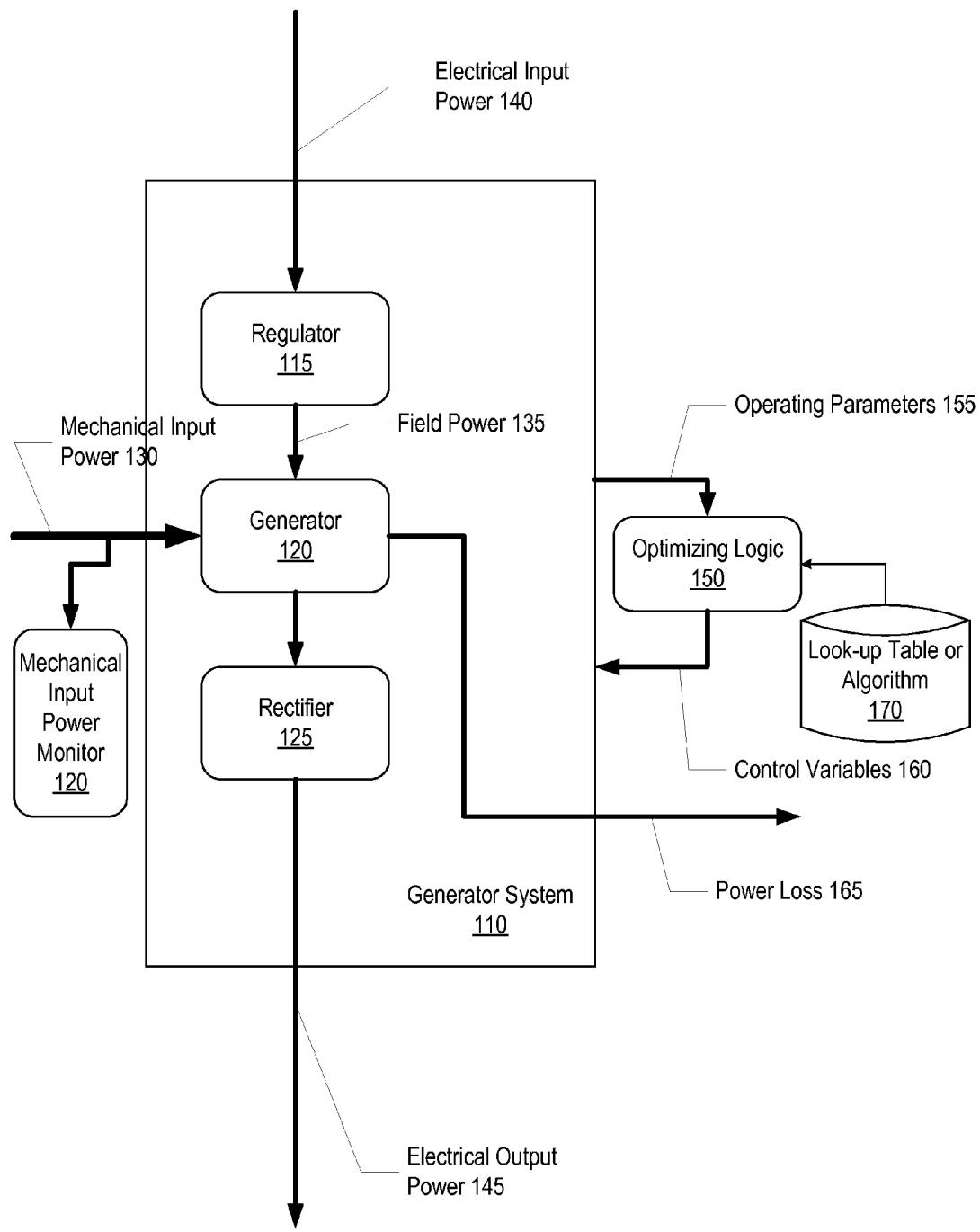
FIG. 1 is a block diagram illustrating a system for optimally operating an generator, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

FIG. 1 is a block diagram illustrating a system for optimally operating an generator, in accordance with some embodiments.

Generator system 110 comprises, among other devices, generator 120, regulator 115, and rectifier 125. Generator 120 is configured to receive mechanical input power 130 and electrical input power 140 and to convert those inputs to electrical output power 145. In some embodiments, generator 120 is configured to receive mechanical rotation from an internal combustion engine, for example, and convert the mechanical energy to electrical energy that may be used to power electrical devices. Such combustion engines and generator systems may be used in automobiles, for example.

In some embodiments, the generator may be an alternator comprising a stator coil and a rotor coil. Field power 135 may be supplied to the rotor coil to generate a magnetic field which may be then rotated relative to the stator coil in order to generate a changing magnetic flux through the stator coil and accordingly a voltage across the stator coil. In some embodiments, three stator coils may be used to generate three sets of voltages at the output of alternator/generator. The field power may be controlled by controlling either the field voltage supplied or the field current supplied.

In some embodiments, regulator 115 is configured to receive electrical input power 140 (voltage and current from the electrical system that may perhaps include a battery) and to supply field power 135 to generator 120. In some embodiments, controlling the field power supplied to the rotor coil can affect the power output of the generator.

For examples of how the field power (voltage or current) can affect the power output, please see U.S. patent application Ser. No. 10/921,009 titled "Systems and Methods for Boosting Output of an Alternator" by O'Gorman et al. filed Aug. 18, 2004 as well as its divisional U.S. patent application Ser. No. 11/389,781 titled "Systems and Methods for Boosting Output of an Alternator" by O'Gorman et al. filed Mar. 27, 2006. Also, please see U.S. patent application Ser. No. 11/200,931 titled "Single Transistor Alternator Field Buck/Boost" by O'Gorman et al. filed on Aug. 10, 2005.

In some embodiments, rectifier 125 is configured to receive the voltages generated by the stator coil or coils and to rectify the voltages to a DC voltage or to a substantially DC voltage. The resultant voltage may be then used to power other devices and/or recharge a battery in the system. In some embodiments, rectifier 125 may use field-effect transistors to rectify the voltage. In other embodiments, diodes may be used. The transistors may be switched on and off at a variable phase angle with respect to the stator voltages. In some embodiments, electrical output power 145 of the generator system 110 may be controlled by controlling the phase angle for switching the transistors.

For examples of how the phase angle may affect power output, please see U.S. patent application Ser. Nos. 11/313,467 and 11/313,358 both titled "Active Rectification of Alternator Output without using a Position Sensor" by O'Gorman et al. both filed on Dec. 21, 2005.

In some embodiments, optimizing logic 150 is configured to monitor various operating parameters of the generator and to determine a field power and a phase angle that minimize the power losses (represented here by power loss 165) in the generator at those operating parameters. The power loss may be defined, for example, as the difference between all the power input into the generator (such as electrical input power 140 and mechanical power 130) and all the power output from the generator system (such as electrical output power 145).

In some embodiments, operating parameters 155 that are provided to optimizing logic 150 include: the rotational speed with which mechanical power 130 is supplied, output power 145 representing the power demands of loads attached to the generator, and the temperature at which the generator is operating. In addition, other operating parameters may be used, such as output voltage, output current, and output current ripple.

In some embodiments, optimizing logic 150 is configured to receive operating parameters 155 and to generate optimal control variables 160. In some embodiments, the generated optimal control variables 160 include field power 135 and the phase angle of rectifier 125. In alternative embodiments, additional control variables may be used against which optimization may be performed.

In some embodiments, optimizing logic 150 is configured to use look-up table/algorithm 170. Look-up table 170 may be prepared so that the table contains substantially optimal control variables for corresponding operating parameters. For example, look-up table 170 may contain substantially optimal values for sets of the field power and the phase angle corresponding to various sets of operating parameters.

In alternative embodiments, in order to decrease the size of the look-up table, only a sample of operating parameters and corresponding control variables may be stored. Smart sampling may be used so that fewer samples may be taken where the parameters are slowly varying and more where the parameters are varying faster. Interpolation algorithms may then be used to interpolate to operating parameters between the included samples in the look-up table.

In alternative embodiments, power loss 165 may be estimated from the provided operating parameters 155. Power loss 165 may be estimated, for example, by monitoring the currents in all the coils that are being used and by assuming that most significant power losses are due to the resistance of these coils. In such embodiments, the control variables (such as the field power and phase angle) are varied while monitoring the power loss (estimating the power loss and using the power loss as feedback) until a substantially minimum and optimal power loss is reached for the current operating parameters (such as rotational speed, desired power output, etc.).

In other alternative embodiments, a combination of a look-up table together with a feedback method may be used to determine the optimal control variables, including information from mechanical input power monitor 120 as to the amount of mechanical input power into the generator. For example, a look-up table may be used to determine initial optimal values for the control variables and then the control may be further refined using a feedback method and an estimation of the power loss.

Optimal control variables 160 are provided to generator system 110 to ensure that the system is operating at a minimum power loss at a given set of operating parameters.

Figure 2:
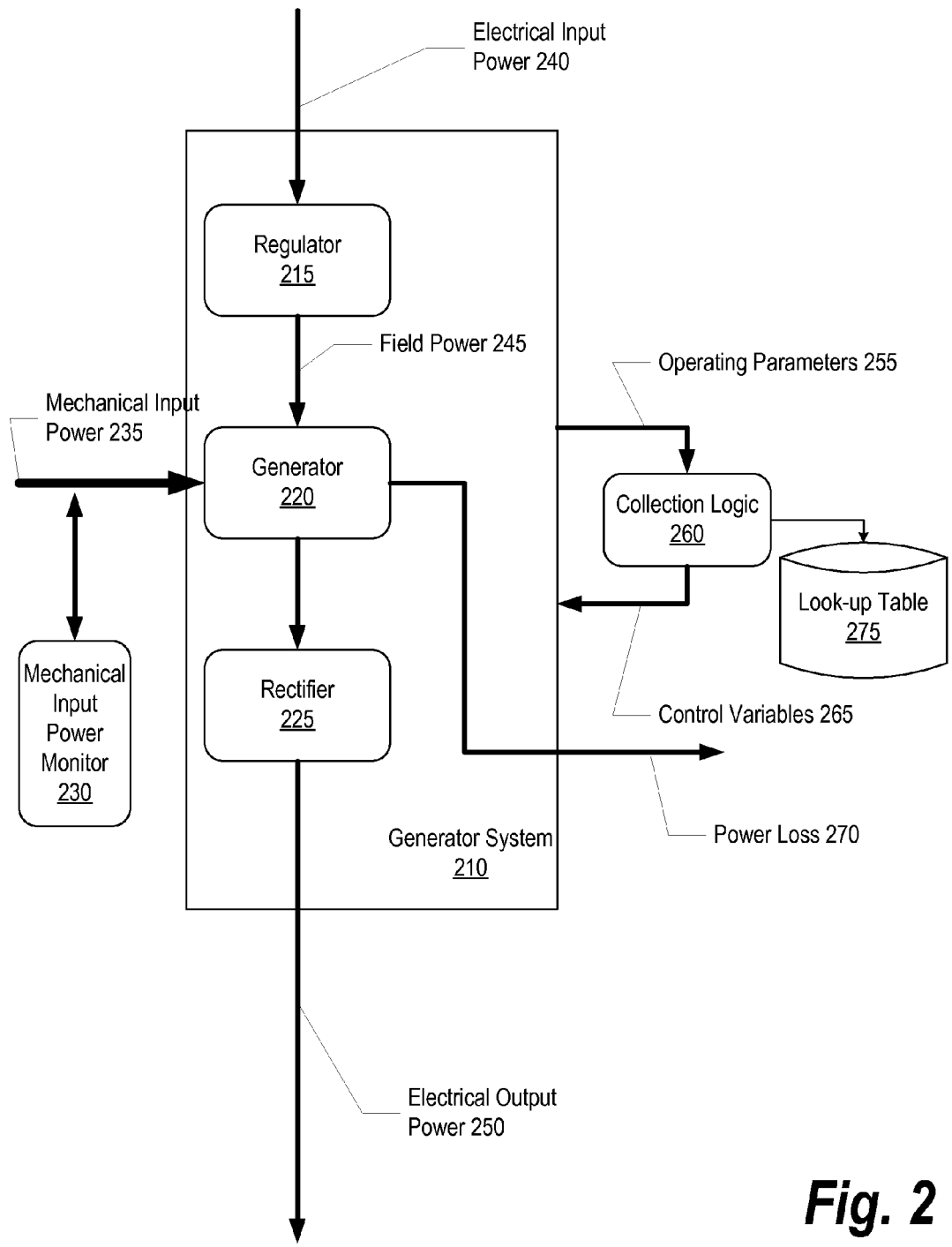
FIG. 2 is a block diagram illustrating a system for determining optimal control variables for various sets of operating parameters for an generator, in accordance with some embodiments.

FIG. 2 is a block diagram illustrating a system for determining optimal control variables for various sets of operating parameters for an generator, in accordance with some embodiments.

Generator system 210 comprises, among other devices, generator 220, regulator 215, and rectifier 225. In some embodiments, the setup in FIG. 2 may be used to calibrate and optimize generator system 210 and to store the calibration/optimization results in look-up table 275.

Generator 220 is configured to receive mechanical input power 240 and electrical input power 240 and to convert those inputs to electrical output power 250. In some embodiments, the generator may be an alternator and may be configured with a stator coil as well as a rotor coil and no permanent magnet as described above. Field power 245 may be supplied to the rotor coil to generate a magnetic field which may be then rotated relative to the stator coil in order to generate a changing magnetic flux through the stator coil and accordingly a voltage across the stator coil. In some embodiments, three stator coils may be used to generate three sets of voltages at the output of alternator/generator.

In some embodiments, regulator 215 is configured to receive electrical input power 240 (voltage and current from the electrical system that may include a battery) and to supply field power 245 to generator 220. In some embodiments, controlling the field power supplied to the rotor coil can affect the power output of the generator.

In some embodiments, rectifier 225 is configured to receive the voltages generated by the stator coil or coils and to rectify the voltages to a DC voltage or to a substantially DC voltage. The resultant voltage may be then used to power other devices and/or recharge a battery in the system. In some embodiments, rectifier 225 may use field-effect transistors to rectify the voltage. In other embodiments, diodes may be used. The transistors may be switched on and off at a variable phase angle with respect to the stator voltages. In some embodiments, electrical output power 245 of the generator system 210 may be controlled by controlling the phase angle for switching the transistors.

In some embodiments, optimizing logic 260 is configured to monitor various operating parameters of the generator as well as mechanical input power 235 as reported by mechanical input power monitor 230 and to determine a field power and a phase angle that minimize the power losses (represented here by power loss 270) in the generator at those operating parameters. The power loss may be defined, for example, as the difference between all the power input into the generator (such as electrical input power 240 and mechanical input power 235) and all the power output from the generator system (such as electrical output power 245).

In some embodiments, operating parameters 255 that are provided to optimizing logic 260 include: the rotational speed with which mechanical input power 235 is supplied, electrical output power 250 representing the power demands of loads attached to the generator, and the temperature at which the generator is operating. In addition, other operating parameters may be used, such as output voltage, output current, and output current ripple. Mechanical input power monitor 230 is configured to monitor and measure the mechanical power into the generator system 210. In some embodiments, mechanical input power monitor 230 may measure the input power by measuring and multiplying the torque and the rotational speed.

In some embodiments, optimizing logic 250 is configured to receive operating parameters 255 and to generate optimal control variables 260. In some embodiments, the generated optimal control variables 260 include field power 235 and the phase angle of rectifier 225. In alternative embodiments, additional control variables may be used against which optimization may be performed.

In one embodiment, control variables are varied according to an optimized sampling method to cover a wide range of sets of values. Once the results are obtained, optimizing logic 250 is configured to store the results in look-up table 270. Look-up table 270 may be prepared so that the table contains substantially optimal control variables for corresponding operating parameters as well as the power loss for each. For example, look-up table 270 may contain substantially optimal values for sets of the field power and the phase angle corresponding to various sets of operating parameters.

In alternative embodiments, in order to decrease of the size of the look-up table, only a sample of operating parameters and corresponding control variables may be stored. Smart sampling may be used so that less samples may be taken where the parameters are slowly varying and more where the parameters are varying faster. Interpolation algorithms may then be used to interpolate to operating parameters between the included samples in the look-up table.

In some embodiments, the calibration procedure shown in the figure may be performed in a laboratory with the generator system not connected to its intended system.

In alternative embodiments, power loss 265 may be estimated from the provided operating parameters 255 using a computer model of the generator system. In some computer modeling methods, for example, the power loss may be computed by considering mechanical as well as electrical and magnetic losses in the system.

Figure 3:
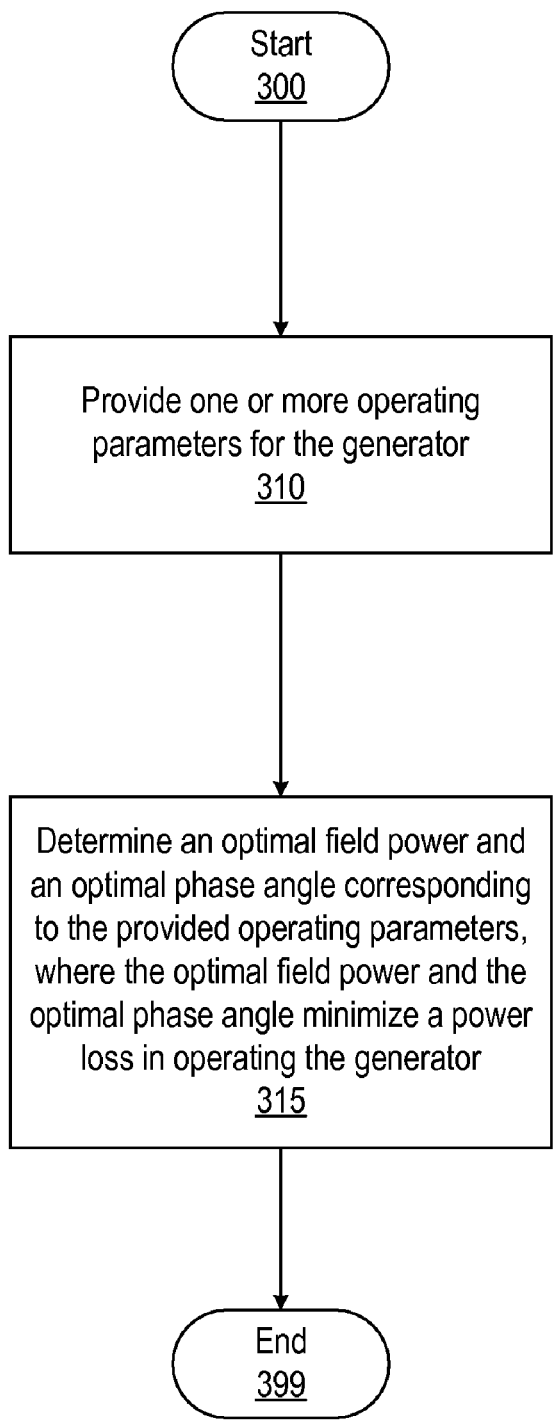
FIG. 3 is a flow diagram illustrating a method for optimizing the operation of an generator, in accordance with some embodiments.

FIG. 3 is a flow diagram illustrating a method for optimizing the operation of an generator, in accordance with some embodiments.

Processing begins at 300, whereupon at block 310, one or more operating parameters are provided for the generator. In some embodiments, the generator may be similar to the generator shown in FIG. 1. The operating parameters may include, for example, the rotational speed of the generator, electrical output power, the temperature at which the generator is operating, output voltage, output current, and output current ripple.

At block 415, an optimal field power and an optimal phase angle are determined. The optimal values correspond to the provided operating parameters. The optimal field power and the optimal phase angle are determined such that power losses in the generator are substantially minimized.

Processing subsequently ends at 499.

Figure 4:
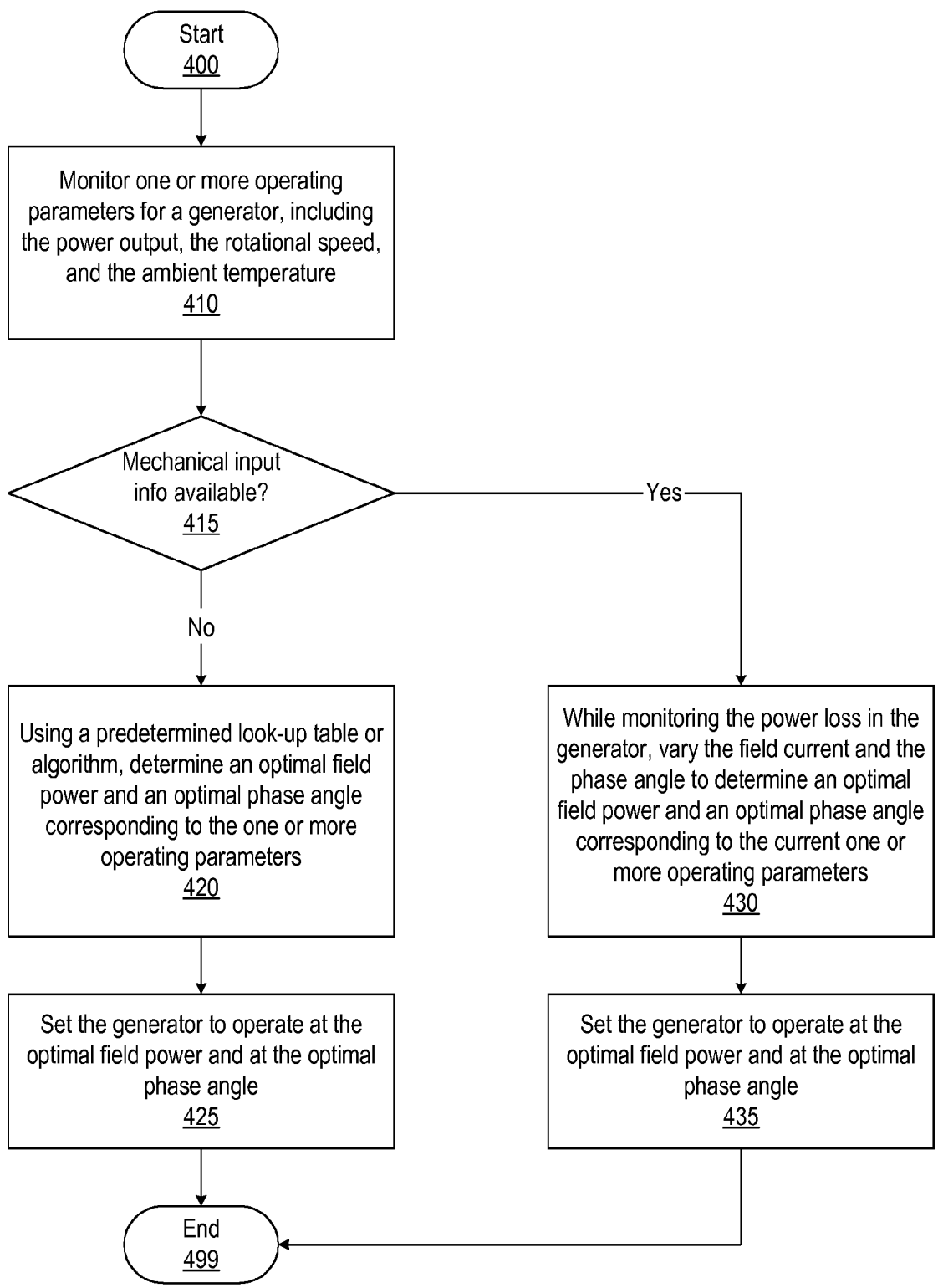
FIG. 4 is a flow diagram illustrating an alternative method for optimizing the operation of an generator, in accordance with some embodiments.

FIG. 4 is a flow diagram illustrating an alternative method for optimizing the operation of an generator, in accordance with some embodiments.

Processing begins at 400 whereupon, at block 410, one or more operating parameters for a generator are monitored. The operating parameters may include, for example, the rotational speed of the generator, electrical output power, the temperature at which the generator is operating, output voltage, output current, and output current ripple.

At decision 415, a determination is made as to whether information is available on the amount of mechanical power delivered to the generator. If information on the amount of mechanical power delivered to the generator is not available, decision 415 branches to the "no" branch where, at block 420, a predetermined look-up table or an algorithm or a combination of the two methods are used to determine an optimal field power and an optimal phase angle corresponding to the one or more monitored operating parameters.

At block 425, the generator is set to operate at the optimal field power and at the optimal phase angle. Processing subsequently ends at 499.

On the other hand, if information is available on the amount of mechanical power delivered to the generator, decision 415 branches to the "yes" branch whereupon, at block 430, while monitoring the power loss in the generator, the field power and the phase angle are varied to determine an optimal field power and optimal phase angle corresponding to the current one or more operating parameters.

At block 435, the generator is set to operate at the optimal field power and at the optimal phase angle. Processing subsequently ends at 499.

Figure 5:
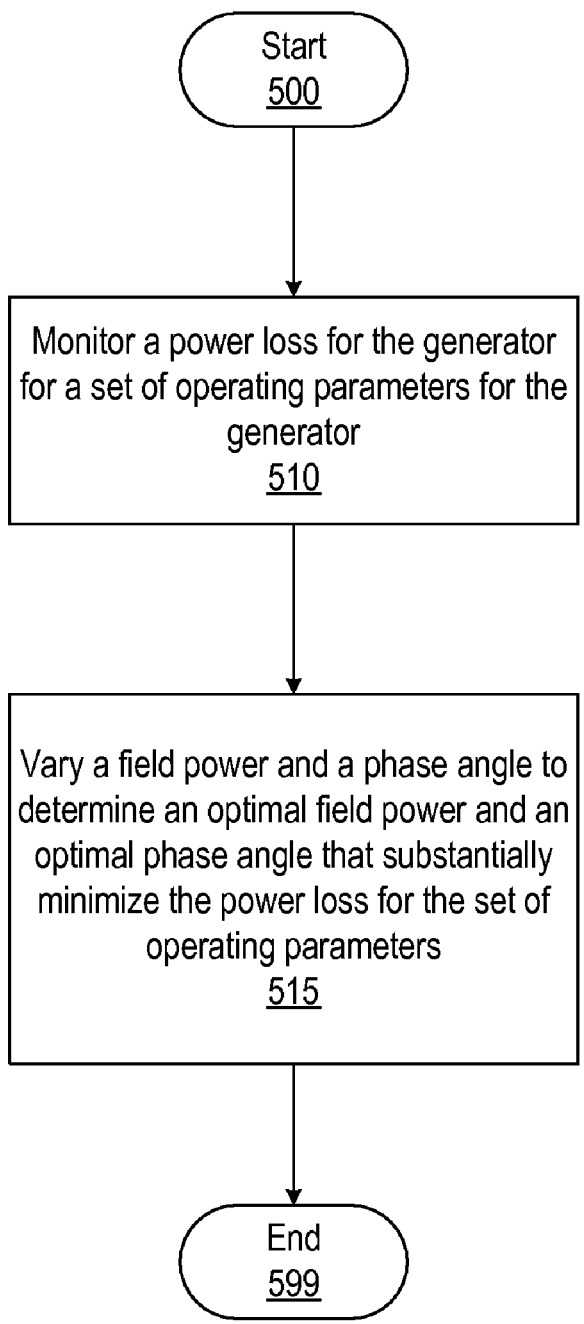
FIG. 5 is a flow diagram illustrating a method for determining optimal control variables for various sets of operating parameters for an generator, in accordance with some embodiments.

FIG. 5 is a flow diagram illustrating a method for determining optimal control variables for various sets of operating parameters for an generator, in accordance with some embodiments.

Processing begins at 500, whereupon, at block 510, a power loss for the generator is monitored for a set of operating parameters. In some embodiments, the generator may be similar to the generator in FIG. 2.

At block 515, the field power and phase angle are varied in order to determine an optimal field power and an optimal phase angle that substantially minimize the power loss for the set of operating parameters.

Processing subsequently ends at 599.

Figure 6:
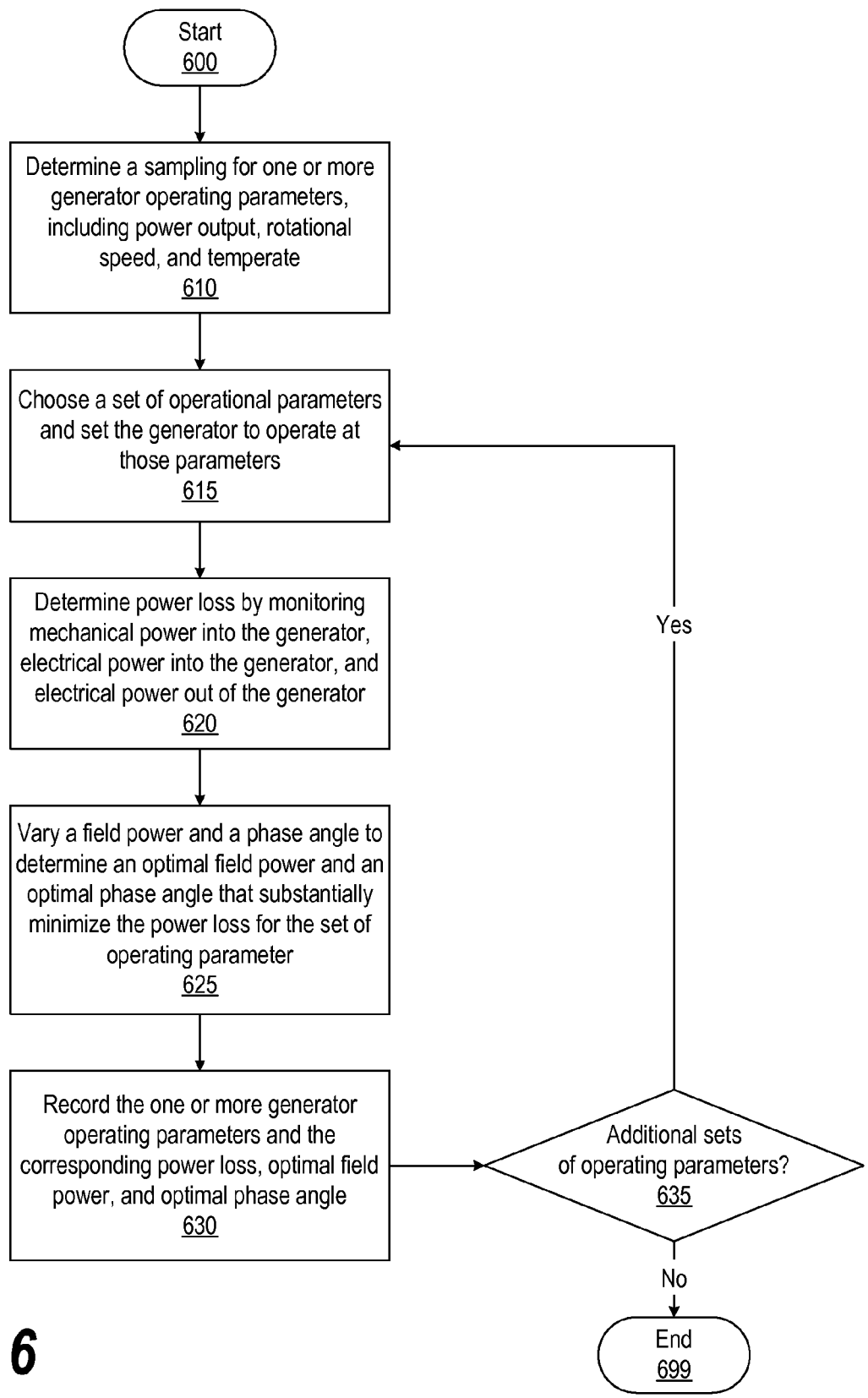
FIG. 6 is a flow diagram illustrating an alternative method for determining optimal control variables for various sets of operating parameters for an generator, in accordance with some embodiments.

FIG. 6 is a flow diagram illustrating an alternative method for determining optimal control variables for various sets of operating parameters for an generator, in accordance with some embodiments.

Processing begins at 600 whereupon, at block 610, a sampling for one or more generator operating parameters is determined. In some embodiments, the operating parameters may include power output, rotation speed, temperature as well as output voltage, output current, and output current ripple.

At block 615, a set of operational parameters is chosen. The generator is then set to operate at those parameters. At block 620, the power loss in the generator is determined by monitoring mechanical power into the generator, electrical power into the generator, and electrical power out of the generator.

At block 625, the field power and the phase angle are varied in order to determine an optimal field power and an optimal phase angle that substantially minimize the power loss for the first set of operating parameters. At block 630, the one or more generator operating parameters and the corresponding power loss, optimal field power, and optimal phase angle are recorded into a look-up table.

At decision 635, a decision is made as to whether additional sets of operating parameters remain to be examined. If additional sets of operating parameters remain, decision 635 branches to the "yes" branch where processing continues at block 615. On the other hand, if no additional sets of operating parameters remain, processing subsequently ends at 699.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for minimizing power loss in a generator, the method comprising:
   providing one or more operating parameters for the generator; and
   determining an optimal field power and an optimal phase angle, where the optimal field power and the optimal phase angle substantially minimize a power loss in operating the generator at the one or more operating parameters.

2. The method of claim 1, where the one or more operating parameters are at least one of: power output, rotational speed, temperature, output voltage, output current, and output current ripple.

3. The method of claim 1, where the power loss is the difference between the power input into the generator, including mechanical and electrical, and the power output from the generator.

4. The method of claim 1, where the determining comprises searching a look-up table using the one or more operating parameters or executing an algorithm or both for the optimal field power and the optimal phase angle.

5. The method of claim 4, further comprising interpolating to additional operational parameters in response to the one or more operating parameters not being present in the table.

6. The method of claim 1, where the determining comprises providing the power loss and, using a feedback circuit, varying the field power and the phase angle in order to determine the optimal field power and the optimal phase angle.

7. A method for minimizing power loss in an generator, the method comprising:
   monitoring a power loss in operating the generator for a set of operating parameters for the generator;
   varying a field power and a phase angle using the power loss as feedback to determine an optimal field power and an optimal phase angle that substantially minimize the power loss for the set of operating parameter.

8. The method of claim 7, further comprising:
   repeating the monitoring and the varying for additional sets of operating parameters to obtain additional corresponding minimum power losses, additional corresponding optimal field powers, and additional corresponding optimal phase angles; and
   recording the additional sets of operating parameters, with the corresponding minimum power losses, the additional corresponding optimal field powers, and the additional corresponding optimal phase angles.

9. The method of claim 7, where the one or more operating parameters are at least one of: power output, rotational speed, temperature, output voltage, output current, and output current ripple.

10. The method of claim 7, where the power loss is the difference between the power input, including mechanical and electrical, into the generator and the electrical power from the generator.

11. The method of claim 7, further comprising a function configured to receive the operating parameters and in response generate the optimal field power and optimal phase angle.

12. A computer program product stored on a computer operable medium, the computer program product comprising software code being effective to:
   receive values for one or more operating parameters for a generator; and
   determine an optimal field power and an optimal phase angle, where the optimal field power and the optimal phase angle substantially minimize a power loss in operating the generator at the one or more operating parameters.

13. The product of claim 12, where the one or more operating parameters are at least one of: power output, rotational speed, temperature, output voltage, output current, and output current ripple.

14. The product of claim 12, where the power loss is the difference between the power input into the generator, including mechanical and electrical, and the power output from the generator.

15. The product of claim 12, where the code being effective to determine comprises the code being effective to search a look-up table using the one or more operating parameters or executing an algorithm or both for the optimal field power and the optimal phase angle.

16. The product of claim 15, the code being further effective to interpolate to additional operational parameters in response to the one or more operating parameters not being present in the table.

17. The product of claim 12, where the code being effective to determine comprises the code being effective to receive a value for the power loss and, using a feedback circuit, vary the field power and the phase angle in order to determine the optimal field power and the optimal phase angle.

18. A generator, the generator comprising:
  a rotor coil configured to receive field electrical power through a regulator;
  a stator coil configured to output electrical power through a rectifier having a phase angle, where the stator coil and the rotor coil are configured to rotate relative to each other using mechanical power;
  one or more processors coupled to the rotor coil and to the stator coil; and
  one or more memory units coupled to the processors, where the processors and the memory units are configured to monitor operating parameters of the generator and are further configured to control the field electrical power and the phase angle and to determine an optimal field power and an optimal phase angle, where the optimal field power and the optimal phase angle substantially minimize a power loss in operating the generator at the one or more operating parameters.

19. The generator of claim 18, where the one or more operating parameters are at least one of: power output, rotational speed, temperature, output voltage, output current, and output current ripple.

20. The generator of claim 18, where the power loss is the difference between the power input into the generator, including mechanical and electrical, and the power output from the generator.

21. The generator of claim 18, where the processors are configured to search a look-up table using the one or more operating parameters or executing an algorithm or both for the optimal field power and the optimal phase angle.

22. The generator of claim 21, the processors are further configured to interpolate to additional operational parameters in response to the one or more operating parameters not being present in the table.

23. The generator of claim 18, where the processors are configured to receive a value for the power loss and, using a feedback circuit, vary the field power and the phase angle in order to determine the optimal field power and the optimal phase angle.

* * * * *